Feb. 14, 1939.  D. FLEISCHER  2,146,727
WEIGHT AND HEIGHT CORRELATING DEVICE
Filed Aug. 11, 1936  4 Sheets-Sheet 1

INVENTOR.
DAVE FLEISCHER
BY Herman Seid
ATTORNEY.

Feb. 14, 1939.   D. FLEISCHER   2,146,727
WEIGHT AND HEIGHT CORRELATING DEVICE
Filed Aug. 11, 1936   4 Sheets-Sheet 2
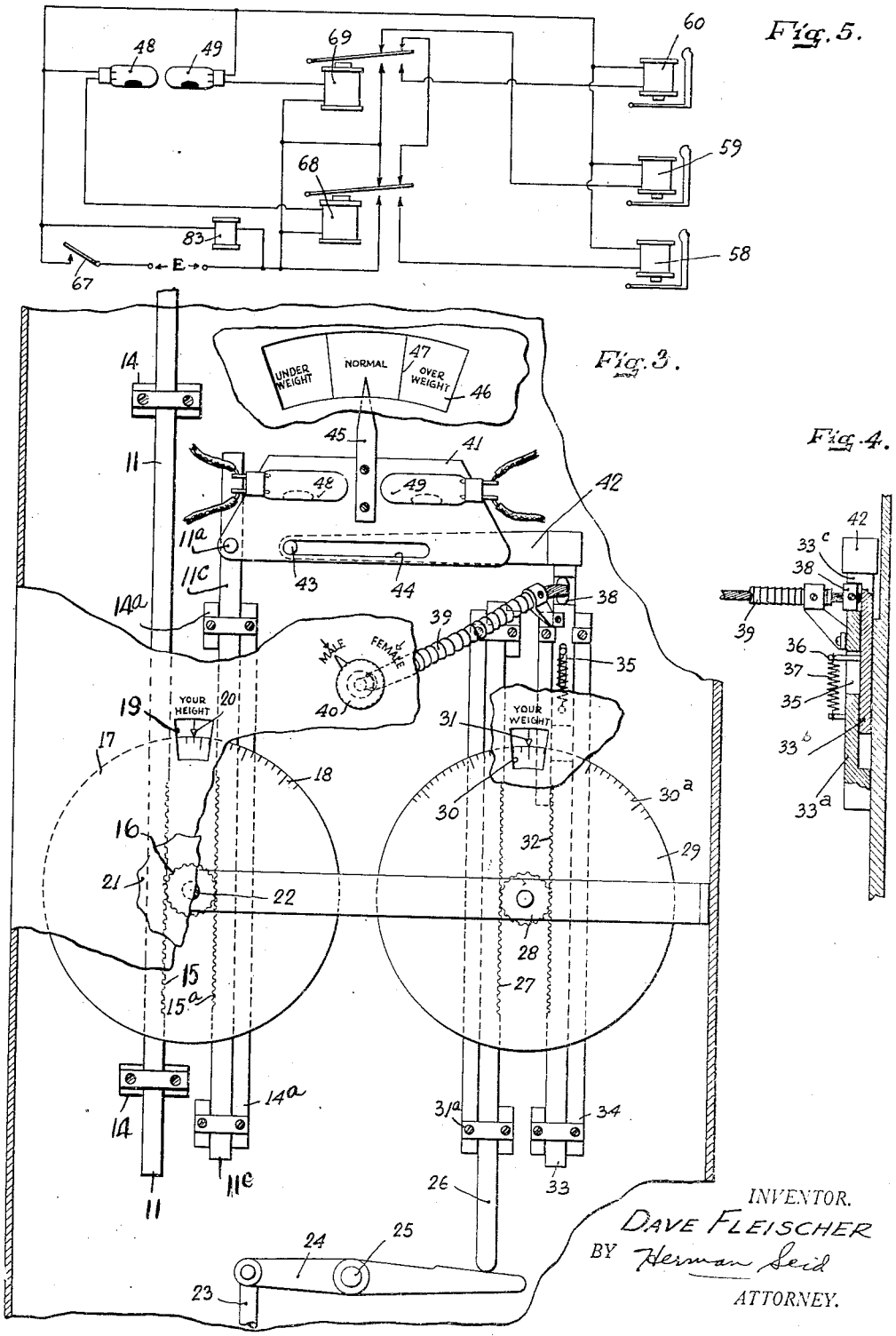

Feb. 14, 1939.  D. FLEISCHER  2,146,727
WEIGHT AND HEIGHT CORRELATING DEVICE
Filed Aug. 11, 1936  4 Sheets-Sheet 3

INVENTOR.
DAVE FLEISCHER
BY Herman Seid
ATTORNEY.

Feb. 14, 1939.  D. FLEISCHER  2,146,727
WEIGHT AND HEIGHT CORRELATING DEVICE
Filed Aug. 11, 1936  4 Sheets-Sheet 4
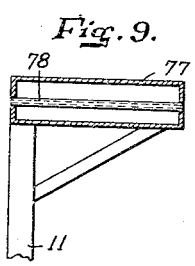
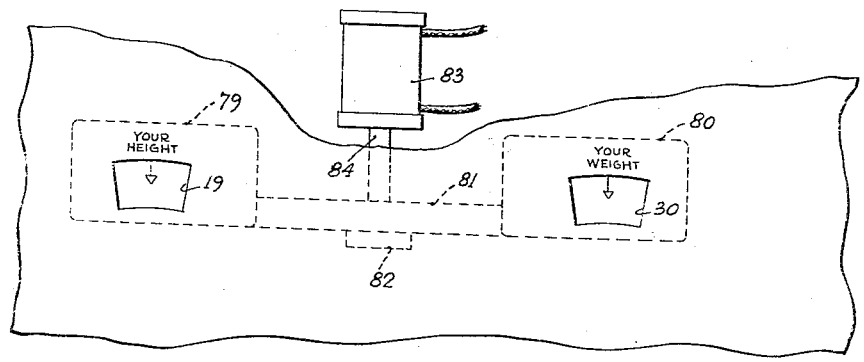
INVENTOR.
DAVE FLEISCHER
BY Herman Seid
ATTORNEY.

Patented Feb. 14, 1939

2,146,727

UNITED STATES PATENT OFFICE 2,146,727

WEIGHT AND HEIGHT CORRELATING DEVICE

Dave Fleischer, New York, N. Y.

Application August 11, 1936, Serial No. 95,347

13 Claims. (Cl. 265—27)

This invention relates to weight-and-height measuring apparatus.

It has been common practise in the past to provide weighing scales with charts or tables indicating the average or normal weights for men and women of different heights. These charts, however, are seldom referred to, since they are slightly complicated and do not engage the attention of persons using the scale.

It is the general object of the invention to provide a method of and apparatus for correlating factors of weight and height, to determine whether persons using the apparatus are of underweight, overweight, or of normal weight.

It is another object of the invention to provide an apparatus embodying a weighing scale, a height-measuring scale, and means for automatically correlating the weight and height scales to indicate overweight, underweight or normal conditions.

It is another object of the invention to provide an apparatus for correlating the measured height and weight of persons using the apparatus, and for delivering to different classes of such persons cards bearing appropriate indicia. Overweight persons will receive one type of card, underweight persons another type of card, and persons of normal weight a third type of card. These cards, for example, may set forth that the persons receiving them are under- or overweight, or normal, or may have printed thereon other information. They may contain, for example, suggested diets—the cards for the underweight persons bearing "building up" diets, the cards for the overweight persons bearing "reducing" diets, and the cards for the persons of normal weight bearing "normal" diets. The cards may set forth health hints, regarding exercise, sleep, the drinking of milk, etc., and may advise seeing one's doctor and dentist.

The operation of the apparatus is simple and entirely automatic, yet fascinating, and by stimulating general interest in maintaining proper weight, tends to improve the public health.

The normal weight of men is somewhat greater than the normal weight of women of the same height. Accordingly, a feature of the invention resides in the provision of an adjustment for selectively adapting the apparatus for use by men and women.

Another feature of the invention resides in the provision of a pointer or the like, for indicating at a glance whether a person is overweight, underweight, or of normal weight, and of means for delivering a card or the like bearing a permanent record of the condition and/or suggestions to the recipient of the card, as outlined above.

A feature of the invention resides in the provision of a first element whose position is determined in accordance with the weight of a person, a second element whose position is determined in accordance with the height of the person, and an element actuated by said first and second elements, the last mentioned element controlling the operation of an indicating device and selectively controlling the operation of card delivering mechanism.

Another feature of the invention resides in the provision of novel card selecting and delivering means.

Another feature of the invention resides in the provision of weight and height measuring apparatus, a plurality of groups of cards, means for selectively delivering cards from one of said groups in accordance with the relation between the weight and height of a person using the apparatus and in accordance with the adjustment of an additional control. Thus, for example, there may be provided several groups of cards, all of which are adapted to be delivered to overweight persons, and a control for delivering cards from different of these groups at different times. If desired, the mechanism may be adjusted so that cards from different groups will be delivered on different days of the week. Hence, if diets are printed upon the cards, monotony may be avoided and interest in both eating the proper food and operating the machine will be sustained.

Other objects and features will be apparent from the following description to be read in connection with the accompanying drawings in which:

Fig. 3 is a front elevational view, broken away in part, on an enlarged scale, of a portion of the apparatus;

Fig. 4 is a side elevational view of the selector device of Fig. 3;

Fig. 5 illustrates an electrical circuit adapted to control the delivery of selected cards;

Fig. 9 is a perspective view of a modified height measuring apparatus; and

Fig. 10 shows a window closing arrangement suitable for use with the invention.

Figure 1:
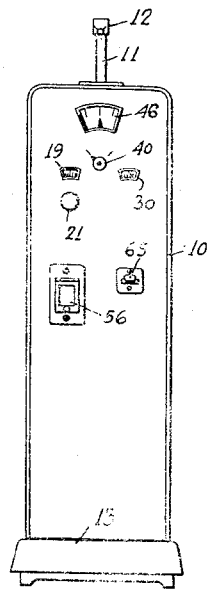
Fig. 1 is a front elevational view of an apparatus embodying the invention.
Figure 2:
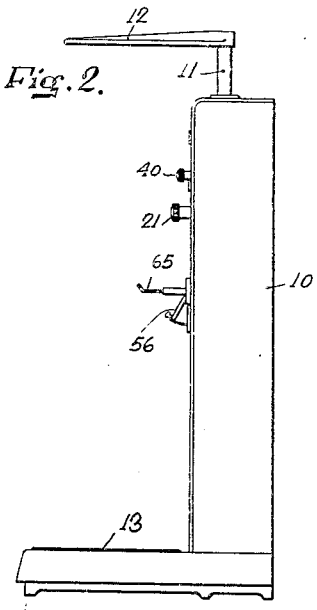
Fig. 2 is a side elevational view of the apparatus of Fig. 1.

Referring now to the drawings, 10 designates a cabinet having a height-measuring member 11 extending upwardly therefrom. Member 11 is raised or lowered until its associated arm 12 rests upon the top of the head of a person standing on the platform 13 of the scale. Member 11 extends within the interior of the cabinet, guided by guides 14, which engage the member 11 with sufficient frictional force to hold the member 11 in any position to which it may be moved. A portion of the side of member 11 is provided with gear teeth 15 adapted to engage the gear-toothed hub 16 of height-indicating wheel 17. As the member 11 is moved up and down within the guides 14, the wheel 17 is rotated. The periphery of the wheel 17 is suitably marked with height scale 18, in order that a person operating the device may read his height on the scale 18 through a window 19 formed in the front of the cabinet. Window 19 is preferably provided with a suitable indicating mark, such as arrow 20, to facilitate reading of the scale. If desired, the adjustment of the member 11 may be effected by turning knob 21, mounted exteriorly of the cabinet on the shaft 22 which carries the hub 16.

On the side of gear-toothed hub 16 which is opposite member 11 is mounted member 11c, with its gear teeth 15a engaging the teeth of hub 16. Member 11c is guided by guides 14a. Thus, when member 11 rises member 11c will be lowered; and when member 11 is lowered member 11c will rise.

Pull-rod 23 is connected to the weighing platform 13 in any desired manner. A wide variety of suitable constructions, well known in the scale art, may be employed, and hence, no further description of this portion of the apparatus (which does not, per se, form part of the invention) is deemed necessary. It is sufficient for present purposes to understand that as a person steps upon platform 13, the pull-rod 23 moves downwardly a distance corresponding to the weight of the person. That is, the pull rod 23 is moved downwardly whenever a person steps upon platform 13 and after the pull rod 23 has come to rest with a person on the platform 13, the final position of the pull rod will depend upon the weight of the person. The heavier the person, the further down the pull rod will be moved, and the lighter the person, the higher will its final position be. Thus, lever 24, actuated by pull rod 23, is rotated about pivot 25 and moves member 26 upwardly to a position determined by the weight of the person upon platform 13. Member 26 is provided with gear teeth 27 which engage the gear-toothed hub 28 of weight-indicating wheel 29. Thus, the position of wheel 29 is dependent upon the weight of a person standing upon the platform 13. The wheel 29 is provided with a weight scale 30a, which may be read through a window 30 formed in the cabinet 10. Preferably, the window 30 is provided with a suitable indicating mark, such as arrow 31. Guides 31a hold and support member 26 in substantially the same manner that guides 14 hold and support member 11, except that the member 26 is not frictionally engaged by the guides 31a, but is free, and sufficiently heavy, to follow the movements of lever 24.

Mounted on the opposite side of the hub 28, with its gear teeth 32 engaging the teeth of hub 28, is member 33, guided by guides 34, similar to guides 31a. Thus, when member 26 rises, member 33 will be lowered; and when member 26 is lowered, member 33 will rise.

It will thus be seen that the height-controlled wheel 17 and the weight-controlled wheel 29 are controlled by and through substantially similar elements; and that the height-responsive element 11c and the weight-responsive element 33 are also controlled by and through substantially identical combinations of apparatus, except that the element 11 is controlled in accordance with the height of persons using the apparatus while the element 26 is controlled in accordance with the weight of persons using the apparatus.

Member 33 is preferably formed in two sections, 33a and 33b, slidable with respect to each other. Through a slot 35 in section 33a extends a pin 36 carried on section 33b. A spring 37, attached to pin 36 and to section 33a, tends to draw the section 33b downwardly towards section 33a. The upper end of section 33b is provided with a shoulder 33c, which extends over the top of section 33a and which, due to the influence of spring 37, tends to abut thereagainst. Positioned between the top of section 33a and shoulder 33c is a cam 38, preferably of oval shape. A flexible cable 39 is connected to the cam 38 and is adapted to change the position of the cam in response to changes in the position of the knob 40, on the front of the cabinet 10, to which the other end of the cable is attached. When the device is used by a man, the knob 40 is turned to turn the cam into such position as to provide maximum separation between the sections 33a and 33b; and when a woman uses the device, the knob is turned to provide minimum separation between sections 33a and 33b. In this way, applicant adapts the device to use by both men and women, although the normal weight of men at various heights is higher than that of women. It is to be noted that notwithstanding this adjustment, the scale 29, as viewed through window 30, will always show the true weight of persons, male or female, using the device.

Pivotally connected to member 11c by pin 11a is control member 41. The top of member 33 is provided with an extension arm 42, carrying pin 43, which extends through a slot 44 formed in the control member 41. It will be seen, therefore, that the position of the control member is adapted to be controlled by both member 11c and member 33, or, in other words, by those members which are respectively height-responsive and weight-responsive.

The pin-and-slot arrangement of member 41 is designed to accommodate changes in distance between shoulder 33c and pin 11a which occur as the device is used.

The apparatus is so designed that when a person whose weight is normal for his height, steps upon the platform 13 and adjusts the member 11 in accordance with his height, the control member 41 will be horizontal. This is equally true whether the person is relatively tall and heavy or relatively short and light, since both member 11c and member 33 move up and down, and since the inclination of member 41 with respect to the horizontal is controlled by the relative, rather than the absolute, positions of the members 11c and 33.

When an underweight person steps upon the platform the member 33 will be moved downwardly through the action of pull-rod 23, lever 24, member 26 and gear 28. However, the final position of member 33 will be higher in the case of such underweight person than it would be if a person of normal weight were using the device. Accordingly, when the members 11c and 33 are in their final positions of adjustment, member 33 will be higher with respect to member 11c than it would be if a person of normal weight were using the device. This will tilt the member 41, as seen in Fig. 3, downwardly toward the left. Member 41 carries a pointer or the like 45, and this pointer would then move to the region marked "Underweight" on a scale 46 adapted to be seen through a window 47 formed in the cabinet 10. In the case of an overweight person, the final adjusted position of member 33 with respect to the member 11c, will be lower than in the case of a person of normal weight, and the member 41 would tilt downwardly toward the right, as seen in Fig. 3. This would shift pointer 45 to the region marked "Overweight" on scale 46. In the case of a person of normal weight, pointer 45 will point to "normal" on scale 46.

Control member 41 carries a mercury switch 48 and a mercury switch 49. The mercury in switch 48 is adapted to complete a circuit between the contacts thereof when the control member 41 shifts to underweight position, and the mercury in switch 49 is adapted to complete a circuit between the contacts thereof when the control member 41 shifts to overweight position.

Figure 7:
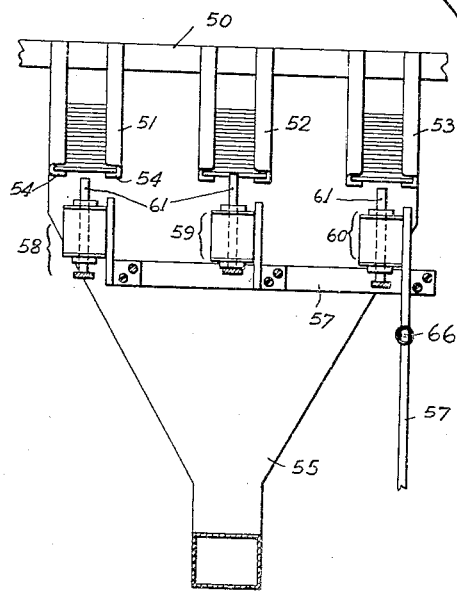
Fig. 7 is a front elevational view of a portion of the apparatus of Fig. 6.

Suitably mounted within the cabinet 10 as by cross support 50, are a plurality of racks designated in Fig. 7 as 51, 52, and 53. Rack 51 may contain cards intended for underweight persons, rack 52 cards for persons of normal weight, and rack 53 cards for overweight persons. The sides of the racks provide feed chutes, and at the bottoms of the racks are provided sets of angles 54. As best seen in Fig. 7, angles 54 provide channels, open at front and rear, through which cards may be ejected from the racks. Preferably, angles 54 depend from the rack through a distance not substantially greater than the thickness of one card, so that only one card may be ejected from the racks at a time. The rear of the racks 51, 52, and 53 feed into card delivery chute 55, to the interior of which a door 56 in the front of cabinet 10 provides access.

Figure 6:
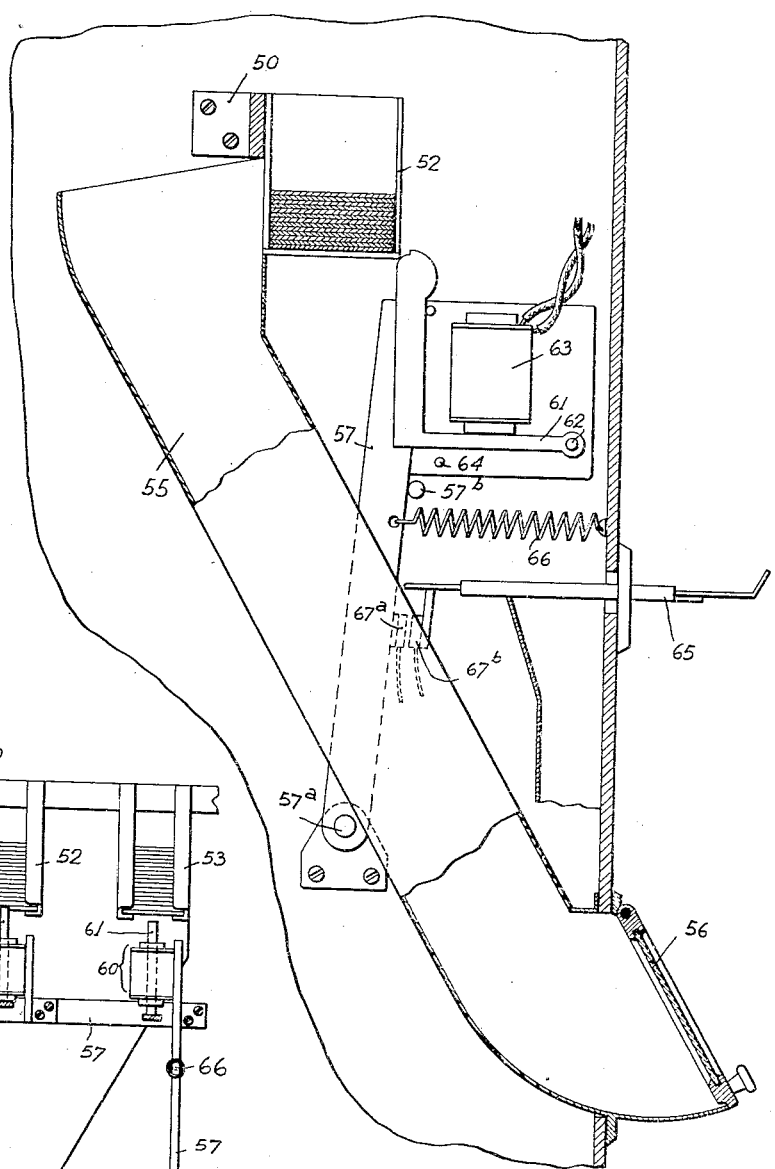
Fig. 6 is a side elevational view of the card chute and ejector apparatus.

Suitably mounted on swinging frame 57, pivotally mounted as at 57a, are a plurality of ejector units, 58, 59 and 60. Each of these comprises an electro-magnet and an ejector arm adapted to be attracted by its associated magnet when the magnet is energized. As shown in Fig. 6, the ejector arm 61 is pivotally mounted at 62, and when the magnet 63 is energized, the ejector arm is drawn upwardly to the magnet from its normal inoperative position in which the ejector arm rests upon stop 64. When a coin is inserted in push slot 65 (which is preferably of the type, well known in the art, which functions only after a coin has been inserted therein) and the slot is pushed in, the swinging frame 57 is pushed rearwardly by the slot against the tension of spring 66. Those ejector arms which are in inoperative position will pass by the under side of the card racks with which they are associated, but the ejector arm which is raised into operative position by the energizing of its associated magnet will abut and eject the lowermost card in its associated rack. In Fig. 7, the ejector arm of ejector unit 59 is shown in raised, or operative, position, while the ejector arms of units 58 and 60 are in inoperative position.

In a preferred form of the invention, switch 67 of Fig. 5 is associated with the push slot 65 in such manner that the switch is closed automatically by the pushing of slot 65. Such push slot and switch arrangements are well known in the art and have long been available commercially. One such arrangement, illustrated in Fig. 6, may consist of an insulated contact 67a carried on the frame 57, and adapted to be abutted by insulated contact 67b, carried by push slot 65, when the slot is pushed in during operation of the device.

In operation, a person will stand upon the platform 13, adjust the member 11, put a coin in the push slot and push the slot. The relative positions of members 33 and 11c will determine the inclination of control member 41; and if the person is underweight, an electrical path will be established between the contacts of switch 48. Thus, relay 68 will be energized to attract its armature, closing a circuit through the magnet of ejector unit 58, and raising the ejector arm of unit 58 into operative position. Thus, the backward motion of frame 57, responsive to the pushing of slot 65, causes the ejector arm of unit 58 to eject a card from rack 51, suitable for delivery to underweight persons, into the delivery chute 55. When the pressure on push slot 65 is released, a spring returns it to its normal position (shown in Fig. 6), opening the contact or switch 67, the forward motion of frame 57 being limited by a suitable stop, such as 57b.

If an overweight person uses the device, the switch 49 will be closed, the relay 69 will be energized, and its armature attracted, the magnet of ejector unit 60 will be energized, and a card from rack 53, suitable for delivery to overweight persons, will be ejected into the delivery chute.

If a person of normal weight uses the device, the magnet of ejector unit 59 will be energized, through an electrical circuit including the armatures of the relays 68 and 69. Thus, a card from rack 52, suitable for delivery to normal persons, will be ejected into the delivery chute.

In addition to receiving a suitable card, a person using the apparatus is enabled to tell at a glance by looking at windows 19, 30 and 47, his weight, his height, and whether he is overweight, underweight, or of normal weight.

Figure 8:
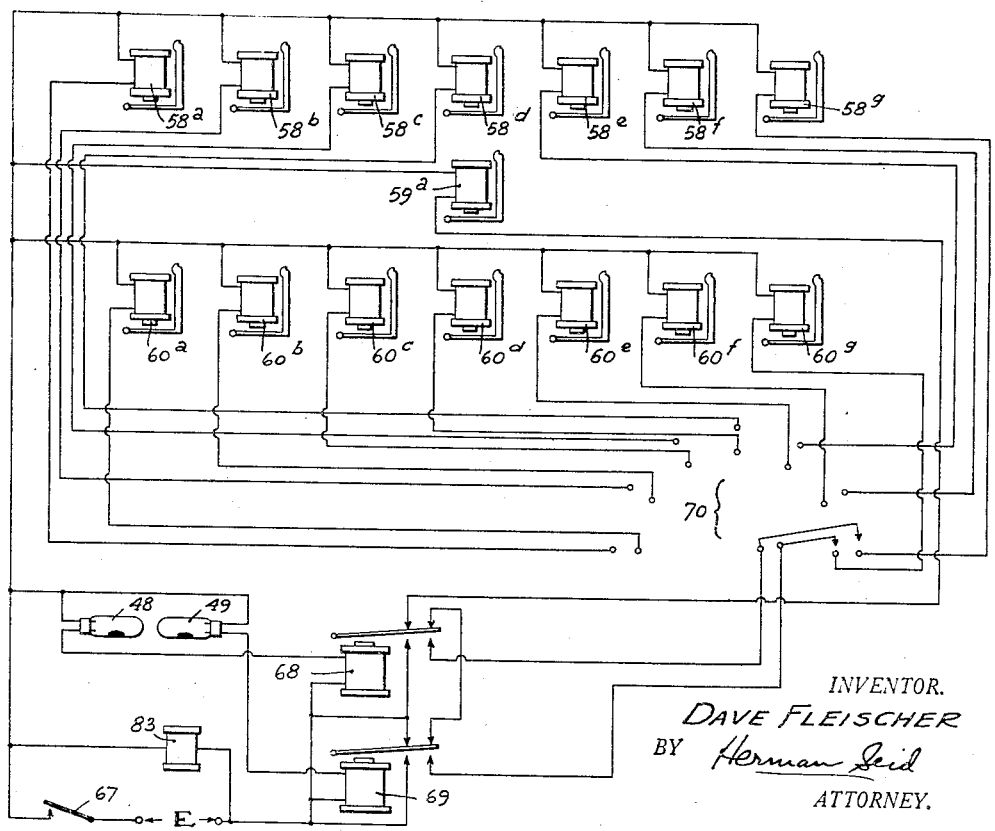
Fig. 8 illustrates a modified circuit arrangement, adapted to be employed in a modification of the invention.

In Fig. 8 is illustrated a circuit arrangement utilized in a modified form of the invention to deliver cards from different predetermined racks or groups at different predetermined times. In Fig. 8, seven ejector units 58a—58g are provided for underweight persons, and seven ejector units, 60a—60g, are provided for overweight persons. As described above, each ejector unit serves a different rack of cards; and the physical arrangement of the apparatus of Fig. 8 may be entirely similar to that of the apparatus above described. The operation of these different ejector units is controlled through seven-way switch 70. Thus, by adjusting switch 70, the operator may select the racks from which his card will be delivered. This control arrangement is especially beneficial when the cards are printed with menu suggestions. In this case, each different position of the switch 70 will deliver a different overweight or underweight diet for a different day of the week. The switch 70 may be operated by an attendant, and changed daily; or it may be operated by persons using the machine, and subject to their control, so that they may obtain a complete set of seven cards by inserting seven coins.

The distance between the top of the head and the level of the eyes is substantially the same for all adults. Thus, the height of the eye level serves as a measure of the height of a person by the application of a fixed correction. In Fig. 10, applicant teaches how to make use of this fact, to eliminate the arm 12, the use of which is sometimes inconvenient due to the necessity for removing hats, the disarrangement of hairdress, etc. Suitably carried on member 11 of Fig. 3 (or member 11b of Fig. 9) is a sight member 77. Sight member 77 preferably contains a relatively long horizontal sight passage 78. When the passage 78 is opposite the level of the eyes, and then only, will the user be enabled to see through the passage 78; and this, therefore, will indicate a proper adjustment of the member 11. The scale 18 is calibrated to show the actual height of passage 78 above the platform 13 plus the distance between the top of the head and eye level. Any similar sight arrangement may be used, and is deemed within the purview of the invention.

To prevent the use of the apparatus except upon the insertion of a coin, the arrangement shown in Fig. 11 may be employed. Directly behind the height-indicating window 19 is an opaque card or the like 79, and directly behind the weight-indicating window 30 is an opaque card or the like 80. Cards 79 and 80 may be joined by a connecting member 81, resting upon stop 82. Solenoid 83 is energized when switch 67 is closed, and draws upwardly bar 84, connected to member 81, thus raising the cards 79 and 80 above the level of the windows 19 and 30 to permit view of the height and weight scales. Upon the opening of switch 67, the cards 79 and 80 are permitted to fall in front of the scales.

Since many modifications may be made in the invention without departing from the scope thereof, it is intended that all matter contained in the foregoing description and illustrated in the accompanying drawings be regarded as illustrative only, applicant limiting himself only as indicated in the appended claims.

I claim:

1. In an apparatus of the character described, a weight-responsive element, a height-responsive element, a plurality of cards, and means under the control of said elements for selecting and delivering different of said cards responsive to changes in the relative positions of said elements.

2. In an apparatus of the character described, means for measuring the height of a person using the apparatus, means for measuring the weight of said person, and means conjointly controlled by said height-measuring means and said weight-measuring means for indicating the relation between the weight and height of said person.

3. In an apparatus of the character described, means for measuring the height of a person using the apparatus, means for measuring the weight of said person, card selecting and delivering mechanism, and means under the control of said height-measuring means and said weight-measuring means for controlling the operation of said mechanism.

4. In an apparatus of the character described, a weight-responsive member, a height-responsive member, said members adapted to be varyingly positioned, and a control element pivotally connected to and carried by said members in such manner that the inclination of said control element will vary in accordance with changes in the relative positions of said members.

5. In an apparatus of the character described, a weight-responsive member, a height-responsive member, said members adapted to be varyingly positioned, a control element pivotally connected to and carried by said members in such manner that the inclination of said control element varies in accordance with changes in the relative positions of said members, and means responsive to changes in the inclination of said control element for indicating overweight, underweight and normal conditions.

6. In an apparatus of the character described, a weight-responsive member, a height-responsive member, said members adapted to be varyingly positioned, a control element pivotally connected to and carried by said members in such manner that the inclination of said control element varies in accordance with changes in the relative positions of said members, card selecting and delivering mechanism, and means responsive to changes in the inclination of said control element for controlling said card selecting mechanism.

7. In an apparatus of the character described, a weight-responsive member, a height-responsive member, said members adapted to be varyingly positioned, a control element pivotally connected to and carried by said members in such manner that the inclination of said control element varies in accordance with changes in the relative positions of said members, means responsive to changes in the inclination of said control element for indicating overweight, underweight and normal conditions, card selecting and delivering mechanism, and means responsive to changes in the inclination of said control element for controlling said card selecting mechanism.

8. In an apparatus of the character described, height-measuring means, weight-measuring means, a plurality of groups of cards, a card ejector for each of said groups, means under the control of said height-measuring means and said weight-measuring means for selectively controlling said card ejectors, and means for actuating said card ejectors.

9. In an apparatus of the character described, a weight-responsive member, a height-responsive member, said members adapted to be varyingly positioned, a control element pivotally connected to and carried by said members in such manner that the inclination of said control element varies in accordance with changes in the relative positions of said members, a plurality of groups of cards, a card ejector for each of said groups, each of said ejectors being adapted to be raised, means responsive to changes in the inclination of said control element for selectively raising said card ejectors into operative position, said card ejectors normally being in inoperative position, and means for actuating said card ejectors.

10. In an apparatus of the character described, height measuring means, weight measuring means, a plurality of groups of cards, card ejector means for each of said groups, means under the control of said height measuring means and said weight measuring means for selectively controlling the operation of said ejector means and other means for selectively controlling the operation of said first-mentioned selective control means.

11. In an apparatus of the character described, height-measuring means, weight-measuring means, a plurality of groups of cards, the cards of one of said groups bearing intelligence of interest to overweight persons, the cards of another of said groups bearing intelligence of interest to underweight persons, the cards of another of said groups bearing intelligence of interest to persons of normal weight, and means under the control of said height-measuring means and said weight-measuring means for selectively delivering cards from said first group to overweight persons using the apparatus and adjusting said height-measuring means and weight-measuring means in accordance with their respective heights and weights, cards from said second group to underweight persons using the apparatus and adjusting said height-measuring means and weight-measuring means in accordance with their respective heights and weights, and cards from said third group to persons of normal weight using the apparatus and adjusting said height-measuring means and weight-measuring means in accordance with their respective heights and weights.

12. In an apparatus of the character described, a first member, weight-responsive means adapted to actuate said first member, a second member, height-responsive means adapted to actuate said second member, said members adapted to be varyingly positioned in accordance with the weights and heights respectively of persons using the apparatus, a control element pivotally connected to and carried by said members in such manner that the inclination of said control element varies in accordance with changes in the relative positions of said members, and additional means for selectively and independently controlling the inclination of said control element.

13. In an apparatus of the character described, a first member, weight-responsive means adapted to actuate said first member, a second member, height-responsive means adapted to actuate said second member, said members adapted to be varyingly positioned in accordance with the weights and heights respectively of persons using the apparatus, one of said members comprising a plurality of portions adjustable with respect to each other, a control element pivotally connected to and carried by said members in such manner that the inclination of said control element varies in accordance with changes in the relative positions of said members, the relative positions of said members being changed in accordance with the conjoint control of said height-responsive means and said weight-responsive means, and additional means for selectively and independently controlling the inclination of said control element, said last-mentioned means including an adjustable spacing element adapted variably to control the separation between portions of one of said members.

DAVE FLEISCHER.